Jan. 20, 1931.　　　E. O. WEDHORN　　　1,789,793
ROUTER CUTTER
Filed May 18, 1929
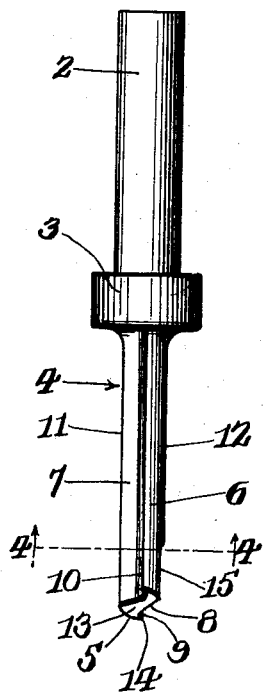
Fig. 1.
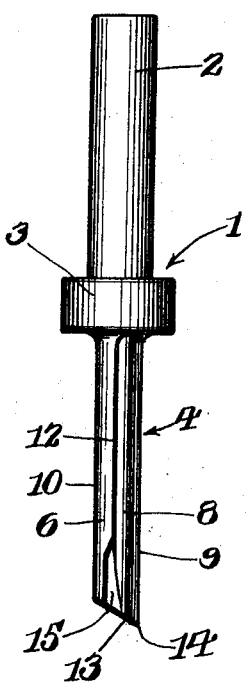
Fig. 2.
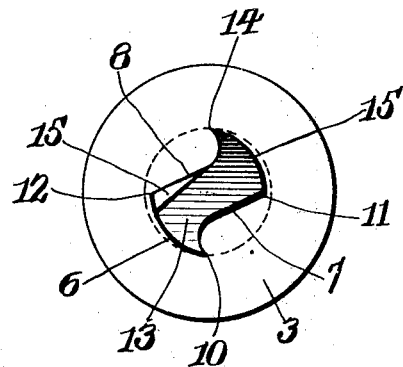
Fig. 3.
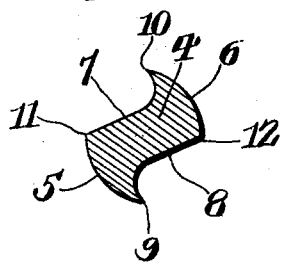
Fig. 4.
Fig. 5.
INVENTOR.
Ernest O. Wedhorn,
BY
Geo. F. Kimmel
ATTORNEY.

Patented Jan. 20, 1931

1,789,793

UNITED STATES PATENT OFFICE

ERNEST O. WEDHORN, OF DETROIT, MICHIGAN

ROUTER CUTTER

Application filed May 18, 1929. Serial No. 364,195.

This invention relates to a router cutter particularly adapted for use in connection with the reproduction of photographs in newspapers or magazines, but it is to be understood that a router cutter in accordance with this invention may be used in connection with any work for which the same is found to be applicable.

The primary object of the invention is to provide, in a manner as hereinafter set forth, a rotatable tool by means of which an inwardly disposed portion of a plate formed of lead, wood, or the like may be cut from the plate in a single operation, thereby effecting a material saving in time and expense.

Other objects and advantages of the invention will be apparent during the course of the following description.

In the accompanying drawings, in which like numerals are employed to designate like parts throughout the same:

Figure 1 is an elevation of a router cutter in accordance with this invention.

Figure 2 is a similar view taken at a right angle to Figure 1.

Figure 3 is a bottom plan of the tool.

Figure 4 is a section taken on line 4—4 of Figure 1.

Figure 5 is a fragmentary, perspective view of the tool.

Referring to the drawings in detail, the numeral 1 designates generally my improved tool which is elongated in form and constructed in one piece. One end portion 2 of the tool is adapted for engagement by a chuck, not shown, for the purpose of rotating the tool, and adjacent the inner end of the portion 2, the tool is provided with an abutment collar 3.

Projecting from the collar 3, in longitudinal alignment with the end portion 2, is the working member or bit 4 of my improved tool. The bit 4 is formed with a pair of laterally projecting, curved blade having oppositely disposed, arcuate, convex faces, 5 and 6, and oppositely disposed, concave faces 7 and 8. The arcuate faces 5 and 6 are eccentrically disposed with respect to the axis of the tool with their leading edges 9 and 10 respectively disposed a greater distance from such axis than their follower edges 11 and 12 respectively. The leading edges 9 and 10 constitute the cutting edges of the blades and are disposed equi-distant from the axis of the bit. The follower edges 11 and 12 are disposed equi-distant from the axis of the bit and upon shorter radii than the cutting edges whereby the latter are extended at acute angles to the outer extremity of the path of the blades caused by the rotation of the bit. The convex faces 5 and 6 merge at their leading edges into the concave faces 8 and 7 respectively at acute angles and merge at their follower edges into the concave faces 7 and 8 respectively at obtuse angles.

The end face 13 of the bit 4 inclines upwardly from the leading edge 9 to the leading edge 10 whereby a relatively sharp point 14 is provided at the lower end of the edge 9. The point 14 constitutes the lowermost extremity of the blade 4 and is the first element to penetrate the work to which the blade is applied. Adjacent the follower edge 12, the convex face 6 is formed with a recess 15 to provide a greater clearance in advance of the point 14. The recess 15 extends for a substantial distance from the inclined end face 13.

In the operation of my improved tool, the latter is rotated preferably at about 3200 revolutions per minute and the point 14 is applied to the work, inside of the margin of the opening which it is desired to make. After the blade 4 has bored through the work in the same manner as an ordinary bit, a lateral force is exerted on the blade in the direction in which it is desired to cut through the work, which causes the leading edges 9 and 10 to cut through the work on the direction line of the applied force.

It is thought that the many advantages of a router cutter in accordance with this invention will be readily apparent, and, although the preferred embodiment of the invention is as illustrated and described, it is to be understood that various changes in the details of construction may be resorted to, so long as such changes fall within the scope of the invention as defined in the appended claims. Particularly it is to be understood that additional cutting edges corresponding to the edges 9 and 10 may be added to the blade 4 if desired.

What I claim is:—

1. A router cutter comprising, a rotatable, elongated bit formed with a pair of oppositely disposed, laterally projecting blades, each having a longitudinally extending cutting edge, said bit having its outer end face inclined from the cutting edge of one blade to the cutting edge of the other blade to provide a point at the peripheral extremity of the bit for entering an object when a longitudinal force is applied to the bit with respect to the object, the longitudinal faces of said blades adjacent the cutting edges thereof being disposed at acute angles to the path of the rotating blades to enable the bit to cut laterally through the object when a lateral force is applied to the bit with respect to the object.

2. A router cutter comprising, a rotatable, elongated bit formed with a pair of oppositely disposed, laterally projecting blades, each having a longitudinally extending cutting edge, said bit having its outer end face inclined from the cutting edge of one blade to the cutting edge of the other blade to provide a point at the peripheral extremity of the bit for entering an object when a longitudinal force is applied to the bit with respect to the object, the longitudinal faces of said blades adjacent the cutting edges thereof being disposed at acute angles to the path of the rotating blades to enable the bit to cut laterally through the object when a lateral force is applied to the bit with respect to the object, one of said blades having a recess extending longitudinally thereof and in following, spaced relation to the cutting edge thereof to provide a clearance in advance of the cutting edge of the other blade.

In testimony whereof, I affix my signature hereto.

ERNEST O. WEDHORN.